(12) United States Patent
Kimura

(10) Patent No.: US 7,736,552 B2
(45) Date of Patent: Jun. 15, 2010

(54) METHOD FOR PRODUCING MOLD FOR ZONAL OPTICAL ELEMENT

(75) Inventor: Shintaro Kimura, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 1148 days.

(21) Appl. No.: 11/020,228

(22) Filed: Dec. 27, 2004

(65) Prior Publication Data

US 2005/0168839 A1    Aug. 4, 2005

(30) Foreign Application Priority Data

Jan. 29, 2004    (JP)    ............................. 2004-021439

(51) Int. Cl.
B29D 11/00    (2006.01)
B23B 1/00    (2006.01)

(52) U.S. Cl. .................. 264/2.5; 264/2.7; 264/1.32; 264/219; 425/808; 409/131

(58) Field of Classification Search .................. 264/1.1, 264/2.1, 2.2, 2.5, 2.7, 138, 219, 1.32; 425/404, 425/435, 445, 444, 808; 451/57; 409/131; 359/742
See application file for complete search history.

(56) References Cited

U.S. PATENT DOCUMENTS

| | | | | |
|---|---|---|---|---|
| 4,456,344 A | * | 6/1984 | Bordignon | .................. 359/742 |
| 4,969,783 A | * | 11/1990 | Ozawa et al. | .............. 409/132 |
| 5,638,212 A | * | 6/1997 | Meyers et al. | ............... 359/569 |
| 5,715,091 A | | 2/1998 | Meyers | |
| 5,770,120 A | * | 6/1998 | Kamihara et al. | .......... 264/1.27 |
| 6,726,859 B2 | * | 4/2004 | Suzuki et al. | ................ 264/2.5 |
| 6,738,202 B2 | | 5/2004 | Hosoe | |
| 6,965,476 B2 | * | 11/2005 | Sato | ............................ 359/569 |
| 7,640,833 B2 | * | 1/2010 | Kimura | ..................... 82/1.11 |
| 2001/0015849 A1 | * | 8/2001 | Ueda et al. | .................. 359/571 |
| 2002/0060857 A1 | * | 5/2002 | Hosoe | ......................... 359/719 |
| 2003/0058532 A1 | * | 3/2003 | Suzuki et al. | ............... 359/455 |
| 2004/0113299 A1 | * | 6/2004 | Hosoe | ......................... 264/2.5 |
| 2006/0144093 A1 | * | 7/2006 | Hosoe | .................... 65/374.12 |
| 2006/0230889 A1 | | 10/2006 | Kimura | |
| 2006/0234607 A1 | * | 10/2006 | Kimura | ....................... 451/42 |

FOREIGN PATENT DOCUMENTS

| | | | |
|---|---|---|---|
| JP | 9-230121 A | | 9/1997 |
| JP | 2000246614 A | * | 9/2000 |
| JP | 2003-62707 A | | 3/2003 |
| JP | 2005-305555 A | | 11/2005 |
| JP | 2006-334688 A | | 12/2006 |
| WO | WO 0229451 A1 | * | 4/2002 |

* cited by examiner

*Primary Examiner*—Philip C Tucker
*Assistant Examiner*—Dimple N Bodawala
(74) *Attorney, Agent, or Firm*—Sughrue Mion, PLLC

(57) ABSTRACT

A method for producing a mold for a zonal optical element including forming a circular portion where, while rotating a work around a rotation axis corresponding to the optical axis as a center, a tip is relatively moved relative to the work to form the circular portion at the mold side corresponding to the circular portion on the processing surface of the work perpendicular to the rotation axis; forming a zonal surface where the tip is relatively moved relative to the work to form a zonal surface at the mold side corresponding to the zonal surface; and forming a corner portion between the boundary portion at the mold side and the zonal surface at the mold side wherein a raked surface of the tip is in contact with a portion corresponding to the boundary wall surface.

8 Claims, 5 Drawing Sheets

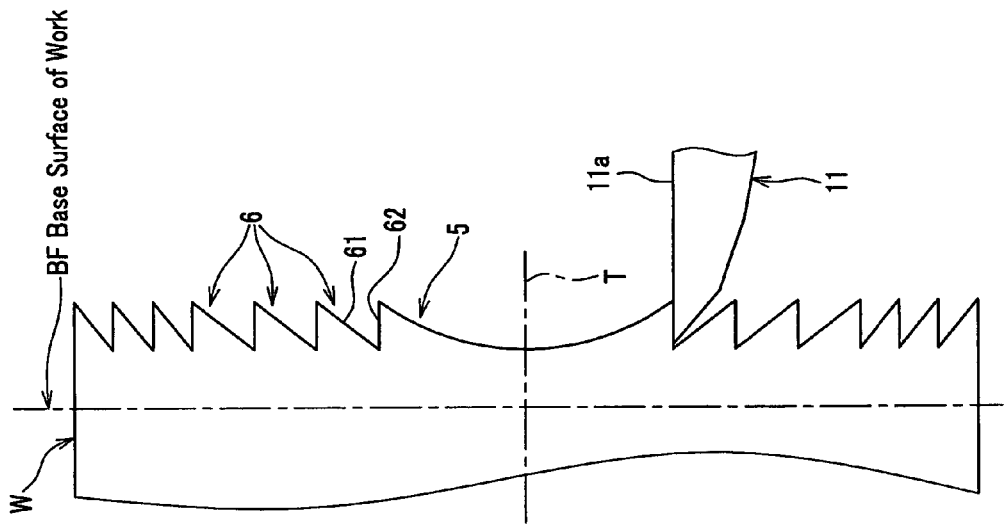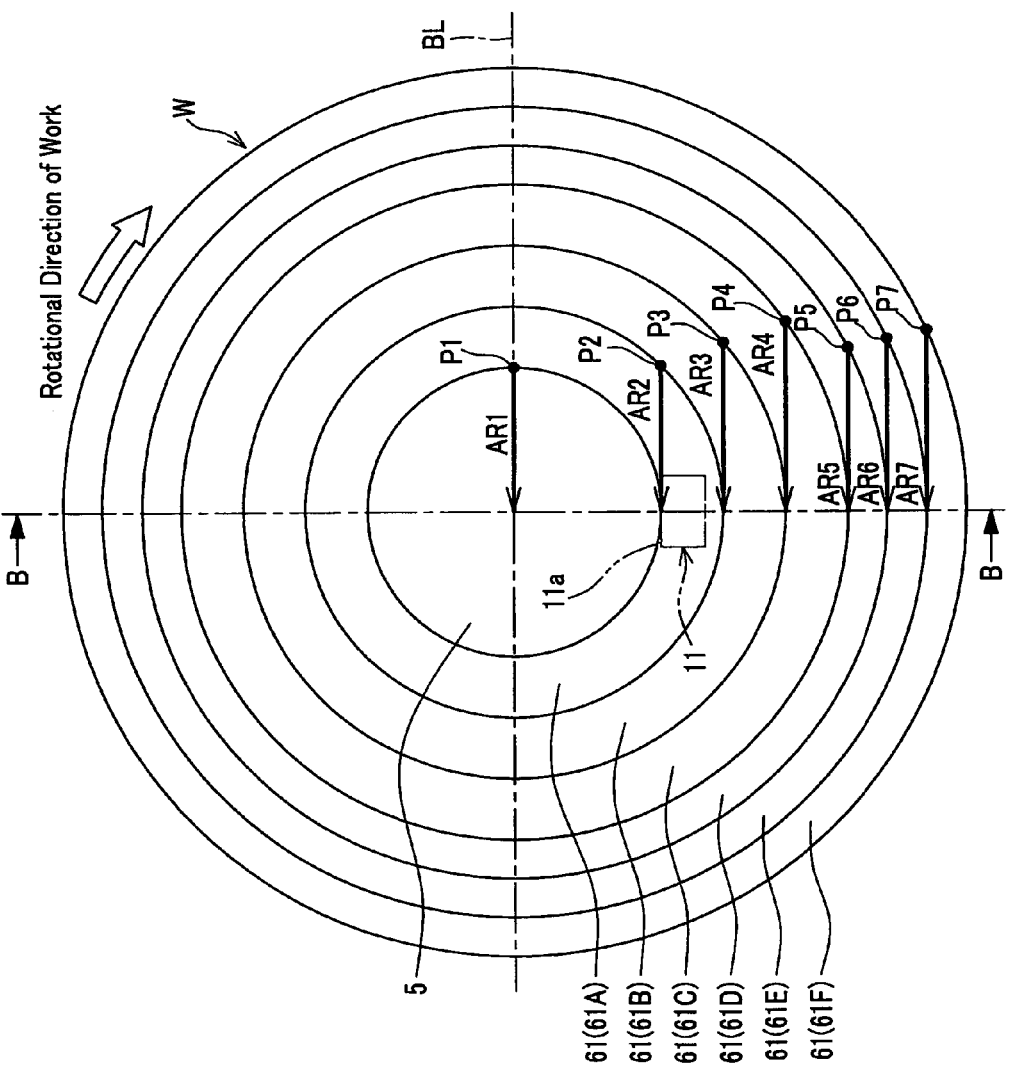

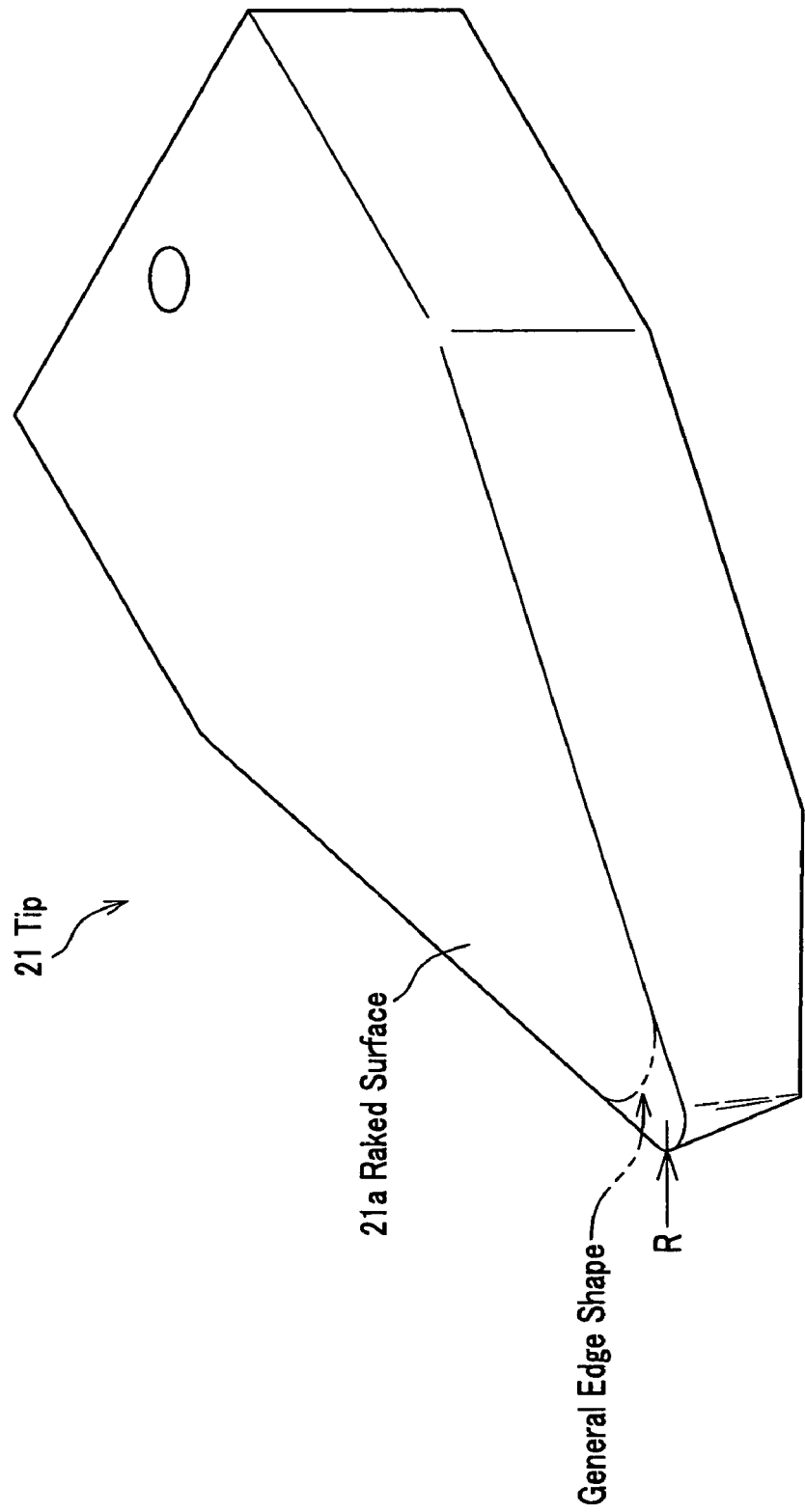

METHOD FOR PRODUCING MOLD FOR ZONAL OPTICAL ELEMENT

BACKGROUND OF THE INVENTION

1. Field of the Invention

The present invention relates to a method for producing a mold for a zonal optical element, which is based on Japanese Patent Application No. 2004-21439 filed on Jan. 29, 2004, disclosure of which is incorporated herein by reference.

2. Description of Related Arts

Optical elements comprising a spherical surface having an optical axis at the center thereof and a plurality of projecting minute zonal portions formed on the circumference of the spherical surface, such as Fresnel lens and blaze type diffraction element, have been produced by utilizing a mold having a concave portion corresponding to the spherical surface and grooves for zones corresponding to the plurality of projecting minute zonal portions (hereinafter referred to as "zonal grooves) as a rule. In such a production process, it is general to cave the minute, zonal grooves through a tip as a rule. In this process, since the edge shape of the tip is copied onto the mold, it has been desired to point the edge shape of the tip (to sharpen the edge of the tip). However, only when the edge of the tip is sharpened, there remains a problem in terms of changing the surface coarseness of the processed surface for the worse. In such a situation, for example, two types of techniques have hitherto be known as methods for producing a mold for a zonal optical element.

Referring to FIG. 4, a first technique is mentioned, which is a method in which the an edge of tip 21 serving as a cutting tool is formed into a curve having a minute radius (minute round shape), to thereby form minute, zonal grooves onto the mold (for example, see Japanese Patent Laid-Open Publication 2003-62707) Specifically, as shown in FIG. 5, while a raked surface 21a of the tip 21 being at a right angle relative to a rotational direction of a column-shaped work W, the tip 21 allows for continuously moving along the direction of the diameter of the column-shaped work W and for moving it in the shaft direction of the work W as occasion demands, whereby the edge of the tip 21 allows for following up a waveform processing surface PF having been coarsely processed to form minutes, zonal grooves 7. This technique makes it possible to enhance the surface coarseness and to form a bottom surface of each zonal groove 7 in much smaller round shape in comparison with the case where the edge of the tip 21 is sharpened.

As a second method, a method for producing an optical element can be mentioned, in which a lithographic technique utilizing many masks to fake the slope of each zonal groove in a state of steps, whereby an optical element itself is produced (for example, see Japanese Patent Laid-Open Publication No. 9-230121). However, the production of the optical element utilizing such a lithographic technique is not suitable for mass production due to long processing period or such. Consequently, the optical element produced by the lithographic technique is used as a model, and the resulting model has often been used to make a reversal process for producing a mold for an optical element through electro-forming and other forming.

However, although the first technique can slightly enhance the surface coarseness in comparison with the processing where the edge of the tip is sharpened, the surface coarseness is not considered to be desirable comparing with the case of caving the processing surface by a generally used tip. In order to enhance the surface coarseness at fullest extent, feeding speed is extremely decreased to make a process in some cases. However, this leads to increasing of processing time, as well as increasing a possibility to changing the shape for the worse due to decreasing the temperature stability in processing environment. Furthermore, the tip is heavily worn since the edge of the tip is sharpened comparing with the generally used tip.

In the reversal process in the second technique, there remains problems in terms of technical difficulties for obtaining sufficient reversibility, and for peeling element without deformation. Moreover, when the slope is faked by steps, at least eight steps are required for the formation of the slope. This poses problems associated with the complexity of aligning the mask per every steps and the like.

An object of the present invention is, therefore, to provide a method for producing a mold for a zonal optical element which can enhance the surface coarseness without taking a longer period of time.

SUMMARY OF THE INVENTION

According to the present invention, there is provided a method for producing a mold for a zonal optical element having a circular portion having a circular shape taking an optical axis as a center viewed from a plane surface; at least one zonal surface formed around the circular portion in a ring form; and boundary wall surfaces connecting said circular portion with the zonal surface or connecting the zonal surfaces with each other. The method of the present invention comprises the following stages: a stage for forming a circular portion where while rotating a work around a rotation axis corresponding to the optical axis as a center, a tip is relatively moved relative to said work to form the circular portion at the mold side corresponding to said circular portion on the processing surface of said work perpendicular to said rotation axis; a stage for forming a zonal surface where said tip is relatively moved relative to said work to form a zonal surface at the mold side corresponding to said zonal surface; and a stage for forming a corner portion between said boundary portion at the mold side and said zonal surface at the mold side wherein a raked surface of said tip is in contact with a portion corresponding to said boundary wall surface.

According to the present invention, there is also provided a mold for a zonal optical element having a circular portion having a circular shape taking an optical axis as a center viewed from a plane surface; at least one zonal surface formed around the circular portion in a ring form; and boundary wall surfaces connecting said circular portion with the zonal surface or connecting the zonal surfaces with each other. The mold of the present invention comprises a circular portion at the mold side corresponding to the circular portion possessed by the zonal optical element; at least one zonal surface at the mold side corresponding to the zonal surface possessed by the zonal optical element; and at least one corner portion between said boundary portion at the mold side and said zonal surface at the mold side wherein said corner portion is in a sharpened state formed by bringing a raked surface of a tip into contact with a portion a portion corresponding to said boundary wall surface.

According to the present invention, there is further provided a zonal optical element produced by the mold of the present invention.

BRIEF DESCRIPTION OF THE DRAWINGS

FIG. 3A is a plane view showing a processing surface of work W, and FIG. 3B is a cross-sectional view of FIG. 3A along with line B-B;

FIG. 4 is an enlarged perspective view showing a conventional tip whose edge is of small round-shape.

DESCRIPTION OF PREFERRED EMBODIMENTS

Referring to the attached figures as occasion may demand, embodiments of the present invention will be described.

Figure 1:
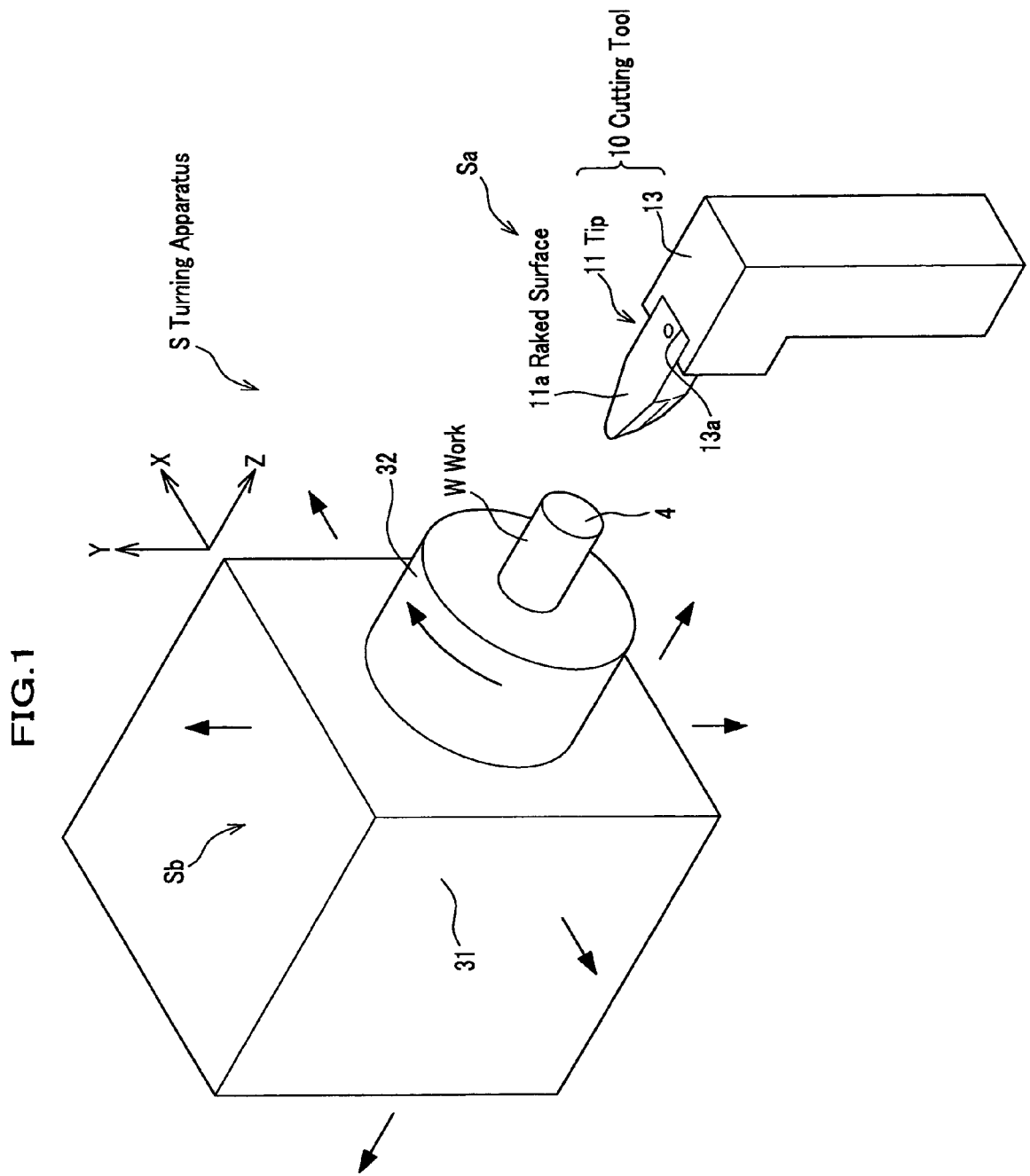
FIG. 1 is a perspective view showing a cutting lathe, which is used in an embodiment of the present invention.

As shown in FIG. 1, a cutting lathe apparatus S is mainly composed of a tool portion Sa having a cutting tool 10, and a head portion onto which a column shaped work W is fitted. As a matter of convenience, the work W and the tip 11 are depicted at sizes different from the real sizes, and the size relationship of them are as shown in FIG. 3.

[Tool Portion]

The tool portion Sa is mainly composed of the cutting tool 10 having the tip 11, and the cutting tool 10 is fixed onto a base (not shown) in a detachable manner.

The cutting tool 10 is mainly composed of the tip 11 and a shank 13 (also referred to as a tip holder or a body of the cutting tool) onto which the tip 11 is fitted in a detachable manner.

Figure 2:
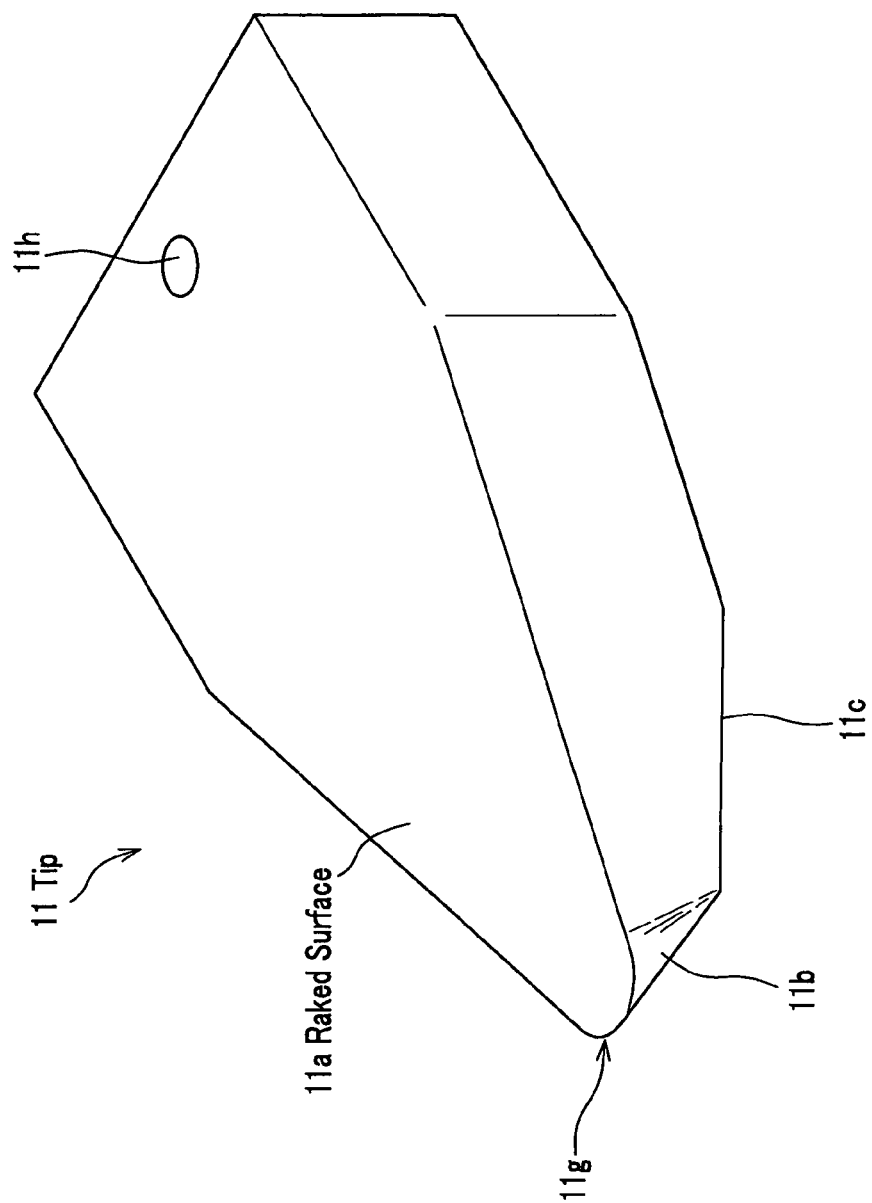
FIG. 2 is an enlarged perspective view showing a tip.

As shown in FIG. 2, the tip 11 is formed into a shape where the size is narrower at the side of the edge pushing into contact with the work W. The tip 11 may be a ready made product produced according to a general standard, the edge shape 11g thereof being formed to have a relatively large radius of curvature.

Further explaining the constitution of the tip 11, one surface of the tip 11 constitutes a raked surface 11a, which is mainly for cutting the work W. Also, at the edge side of the tip 11, the first escape surface 11b and the second escape surface 11c are formed continuously with the edge shape 11g in order to avoid interference with the work W. In this embodiment, an escape angle (an angle relative to the base surface BF of the work, which will be described fully later on) of the first escape surface 11b is formed so as to be greater than an angle of a slope of a zonal surface 61 (which will be described fully later on, see FIG. 3B) formed on the work W.

Onto the base portion of the tip 11 is perforated a bolt pore 11h, so that the tip 11 may be provided on a tip-holding portion 13a of the shank 13 (see FIG. 1) by a bolt (not shown) in a detachable manner. The method for fixing the tip 11 onto the shank 13 is not restricted to the method utilizing a bolt, but may be a soldering method or any of other known methods.

As shown in FIG. 1, the shank 11 is an arm having a substantial reverse L-shape, with the tip holding portion 13a being formed on one end thereof. The other end of the shank 11 is fixed on a base (not shown) in a detachable manner.

[Head Portion]

A head portion Sb is mainly composed of a moving stage 31 for changing the relative portion of the work W to the tip 11 in a three-dimensional direction, and a chuck 32 for rotating the work W.

The moving stage 31 possesses a moving mechanism in a longitudinal direction, a moving mechanism in a horizontal direction, and a moving mechanism in a vertical direction (all moving mechanisms being not shown), whereby the moving stage 31 can be moved in three ways of the longitudinal direction, the horizontal direction, and the vertical direction. Specifically, as shown in FIG. 1 by a coordinate axis, the moving stage 31 is movable to the Z-axis parallel to the main axis line of the head portion SB, which is the longitudinal direction; the X-axis perpendicular to the Z-axis, which is the horizontal direction; and the Y-axis perpendicular to the Z-axis, which is the vertical direction.

The chuck 32 is a portion onto which the column shaped work W is fitted, and, holds the work W, for example, by means of a vacuum chuck or a plurality of jaws (also referred to as collets; not shown). The chuck 32 is rotatably fitted on the moving stage 31, and rotates at a prescribed speed by a driving motor or such (not shown). The rotation speed of the chuck 32 is a general rotation speed, which is a relatively high.

The work W is a material for molding a zonal optical element such as Fresnel lens (zonal optical element having a spherical surface having a center on the optical axis, and a plurality of projection zonal portions formed around the spherical surface). Specifically, as shown in FIG. 3A and FIG. 3B, a concave portion 5 corresponding to the spherical surface of the zonal optical element and zonal grooves 6 corresponding to the plurality of zonal portions of the zonal optical element are formed by the tip 11. The spherical surface of the Fresnel lens corresponds to a circular potion, and each zonal portion corresponds to the zonal surface and the boundary wall surface. The concave portion 5 corresponds to the a circular portion at the mold side, and each zonal groove 6 corresponds to the zonal surface at the mold side and the boundary surface at the mold side.

As shown in FIG. 3B, each zonal grooves 6 is mainly composed of a zonal surface 61 (a zonal surface at the mold side) in a slope form and a boundary surface 62 (boundary wall surface at the mold side) which stands substantially vertical direction relative to the base surface BF of the work. The term base surface BF of the work intended herein is a virtual surface perpendicular to the rotation axis T of the work W. An angle of each zonal surface 61 (an angle relative to the base surface BF of the work) is smaller than the angle of the first escape surface 11b of the tip 11. In convenience, from the center side to the outermost side, each of the plurality of the zonal surfaces 61 is sometimes called a first zonal surface 61A, a second zonal surface 61B, a third zonal surface 61C, a fourth zonal surface 61D, a fifth zonal surface 61E, and a sixth zonal surface 61F.

Subsequently, a method for producing a mold utilizing the cutting lathe apparatus S will be described.

In this embodiment, prior to cutting the work by means of the tip 11, the concave portion 5 and the zonal grooves 6 have been roughly processed on the work W in advance. The "rough processing" may be a method where the shape of the processing surface 4 is roughly formed (cut) by roughly cutting the work W by means of other cutting tool, or other methods.

As shown in FIG. 1, by rotationally driving the chuck 32, the work W is rotated as a center of the rotation axis T corresponding to the optical axis of the Fresnel lens (see FIG. 3) and, at the same time, the work W is moved by means of the moving stage 31, whereby the raked surface 11a of the tip 11 is positioned at a first processing point P1 (see FIG. 3A). The term "first processing point" intended herein is a position which crosses a base line BL extending towards the direction of the diameter of the work W passing through center of the work W with the outer circumference of the concave portion 5 (a position slightly far from the outer circumference of the concave portion 5 toward a near side in FIG. 3A). By moving the work W by means of the moving stage 31 as just mentioned, the tip 11 is relatively moved to the work W. In the following description, the description for the movement of the work W will be omitted and the movement of the tip 11 relative to the work will be representatively described in convenience.

As shown in FIG. 3A, the tip 11 is moved to the direction of the arrow AR1 (left and far side in this figure, i.e., the direction along the spherical surface of the concave portion 5) to form the concave portion 5 (stage for forming a circular portion). After the formation of the concave portion 5 has been completed, the tip 11 is once released (detached) from the work W, after which the tip 11 is moved towards a lower direction and a right direction, to position the raked surface 11a of the tip 11 at a second processing point P2. The term "second processing point" intended herein is a position which crosses a tangent line parallel to the base line BL and in contact with the outer circumference of the concave portion 5 with the outer circumference of the first zonal surface 61A (a position slightly far from the prescribed position of the first zonal surface 61A toward a near side in FIG. 3A).

Then, the tip 11 is moved towards the arrow AR2 (a left direction and a far direction in the figure), i.e., the tip 11 is two-dimensionally moved substantially parallel to the raked surface 11a thereof, to form the zonal surface 61 (Stage for forming a zonal surface).

Thereafter, when the tip 11 is moved to the boundary wall surface 62 (the terminal of the arrow AR2), the raked surface 11a of the tip 11 is in contact with the boundary wall surface 62 between the concave portion 5 and the first zonal surface 61A to thereby form the boundary wall surface 62. At this time, the corner portion of the zonal groove 62 is processed so that as if the corner portion of the zonal groove 62 is caved by the edge portion of the raked surface 11a of the tip 11 (actually, the work W diagonally enters relative to the raked surface 11a whereby the work W is caved). Consequently, the edge shape 11g of the tip 11 (see FIG. 2) is not copied onto the work W, the corner of the zonal groove 6 is formed in a sharpened form (the stage for forming a corner portion).

Thereafter, the tip 11 is moved to a third processing point P3, a fourth processing point P4, a fifth processing point P5, a sixth processing point P6, and a seventh processing point P7 in order to carry out the stages for forming a zonal surface (cutting along the arrows AR3 to AR7) and the stages for forming a corner portion, whereby a plurality of the zonal grooves 6 can be formed. Theses processing points P3 to P7 indicate positions each crossing a tangent line parallel to the base line BL and in contact with the outer circumference of each of inner zonal surface 61 (61A to 61E) with the outer circumference of each of outer zonal surface 61(61B to 61F) (positions slightly far from of the second zonal surface 61B, the third zonal surface 61C, the fourth zonal surface 61D, the fifth zonal surface 61E, and the sixth zonal surface 61F) toward a near side). Specifically, in this embodiment, the tip 11 is moved so that the raked surface 11a is along with each tangent line of each boundary wall surface formed in a cylindrical shape, whereby each zonal surface 61, each boundary wall surface 62, and each corner portion can be formed.

As described above, the present invention has the following advantages: Bringing the raked surface 11a of the tip 11 into contact with the boundary wall surface 62 in the stage for forming a corner portion, the edge shape of the raked surface is not copied onto the work; thus; a tip 11, which is a general tip having a relatively large radius of curvature, can be used. This in turn makes it possible to process a mold for producing a zonal optical element having good surface coarseness without spending a long period of time. In addition, since the tip 11, which is a general tip having a relatively large radius of curvature can be used as just mentioned, the abrasion of the tip can be reduced in comparison with a tip having a small radius of curvature as used the conventional technique.

When the concave portions 5 and the zonal grooves 6 have been roughly processed prior to cutting with the tip 11, the abrasion of the tip 11, which is finally used in the finish process can be much more reduced.

Figure 5A:
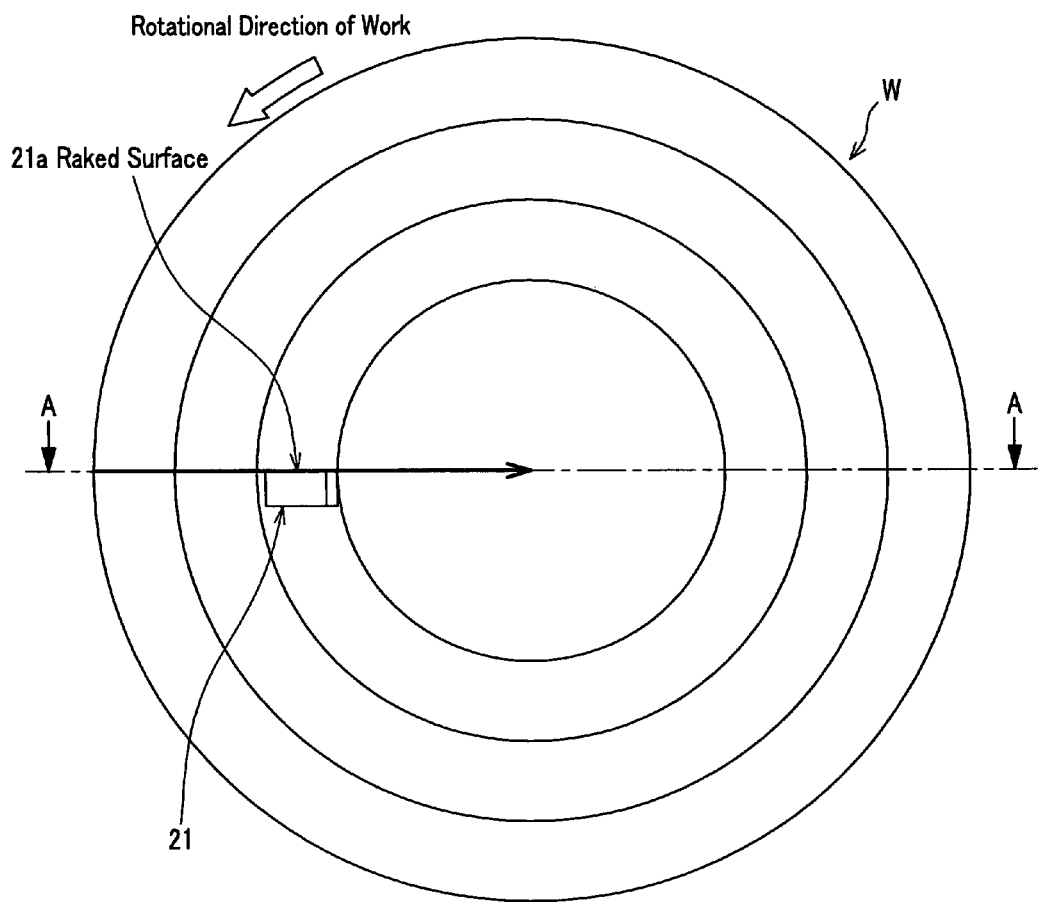
FIG. 5A is a plane view showing a processing surface of a, and FIG. 5B is a cross-sectional view of FIG. 5B along with line A-A.
Figure 5B:
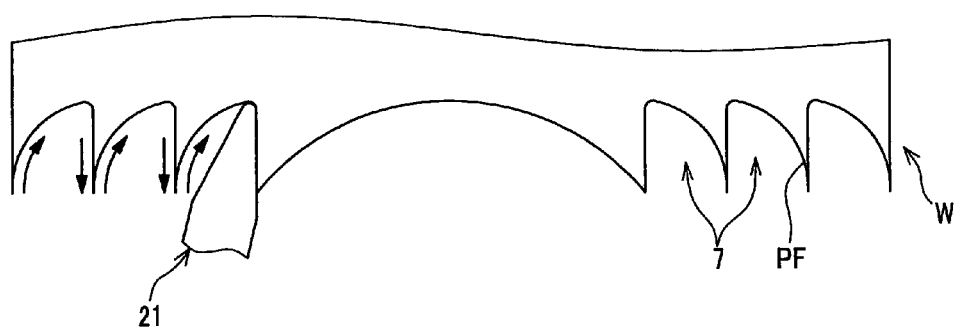
FIG. 5 shows the conventional method for producing a mold, where

Also, in the method of the present invention according to this embodiment, since the work W can be cut only with a top portion of the edge of the tip, a tip whose top portion has been processed with high precision can be used in the processing. Specifically, since a boarder precision width (wind angle) can be set to be small, a mold for producing a zonal optical element can be produced within a shorter period of time with high precision. In the conventional process (process shown in FIG. 5), since main parts of the edge portion should be processed with high precision (the wind angle must be set to be high), much more cost is required and the production period becomes longer.

It should be noted that the present invention is not restricted to the embodiment described above, and various modifications can be made. In this embodiment, while the boundary surface wall 62 is perpendicular to the base surface WF of the work, the present invention is not restricted thereto. For example, the boundary wall surface 62 may be tilted by changing the direction of the raked surface 11a of the tip 11 in the stage for forming a corner portion. According to this stage, the vertical wall of the mold is formed in a tapered state and, thus, a zonal optical element produced can easily released from the mold. Also, the raked surface 11a may be tilted so that the base end of the raked surface 11a is approaching the processing surface 4 or the raked surface 11a may be tilted taking an axis parallel to the rotation axis T as a center. The tilting angle is preferably not more than 5°, in the former case, and is preferably not more than 3° in the latter case.

In this embodiment, while the moving stage 31, which is movable in three axes at a side of the head portion Sb, the present invention is not restricted thereto. For example, it may be configured that the side of the head portion Sb is fixed, and a moving stage, which is movable in three axes (longitudinal direction, horizontal direction, and vertical direction) at a side of the tool portion Sa, or a moving stage, which is movable in one axis (e.g., longitudinal direction) is provided at a side of the head portion Sb, and a moving stage, which is movable in two axes (e.g., horizontal direction, and vertical direction) at a side of the tool portion Sa is provided at a side of the tool portion Sa.

In this embodiment, while the process is carried out in the order of the stage for forming a circular portion, a stage for forming the innermost zonal surface, a stage for forming the innermost corner portion, a stage for forming another zonal surface, a stage for forming another corner portion . . . , and a stage for forming the outermost corner portion, the order of the stages are not restricted thereto. For example, the process can be carried out in the reverse order, i.e., in the order of the stage for forming the outermost corner portion, . . . the stage for forming another corner portion, the stage for forming another zonal surface, the stage for forming the innermost corner portion, the stage for forming the innermost zonal surface, and the stage for forming a circular portion. In this case, the starting positions of the tip 11 for forming respective zonal grooves 6 are end terminals of AR7, AR6, AR5, AR4, AR3, and AR2 (in adjacent to the respective boundary wall surfaces). However, the starting position of the tip 11 for forming the concave portion 5 is preferably the starting point of the arrow AR1 similar to this embodiment, because the rotation speed of the work W is zero at the end terminal of the arrow AR1.

In this embodiment, a rough processing is performed prior to the finishing processing with the tip 11, the present invention is not restricted thereto, and a work W having not been processed may be directly processed with the tip 11. In this case, boundary wall surface 62 has not been formed. However, since the positions of the boundary wall surfaces and the processing positions can be set by suitably modifying a program of NC processing apparatus (cutting lathe apparatus S), the raked surface 11a of the tip 11 can be in contact with a position corresponding to the boundary wall surface 62 to form the corner portion of the zonal groove 6 in a sharpened state. Also, it is of course possible to carry out either rough processing of zonal surface or preferably rough processing of the corner portion.

In this embodiment, the present invention is mainly applied to a processing of a mold for producing a Fresnel lens having a concave portion 5 and a plurality of zonal grooves 6, the present invention is not restricted thereto. For example, the present invention is applicable to production of a mold for a zonal optical element having a circular portion having a circular shape taking the optical axis as a center viewed from plane surface, and a plurality of zonal surfaces, and having a stepped concave portion formed by proving steps (boundary wall surfaces) between the circular portion and the adjacent zonal surface as well as between the neighboring zonal surfaces.

In this embodiment, while the present invention is applied to a type of the mold where the cross-sectional shape of the zonal surface 61 is in a linear state, for example, a type of zonal optical element whose the cross-sectional shape of the zonal surface is a curved surface as shown in the drawing for prior art (FIG. 5) may also apply the present invention.

What is claimed is:

1. A method for producing a mold for a zonal optical element, the zonal optical element having
    a circular portion having a circular shape taking an optical axis as a center viewed from a plane surface;
    at least one zonal surface formed around the circular portion in a ring form; and
    boundary wall surfaces connecting said circular portion with the zonal surface or connecting the zonal surfaces with each other;
said method comprising
    forming a circular portion of the mold by, while rotating a work around a rotation axis corresponding to the optical axis as a center, moving a tip relative to said work to form the circular portion of the mold on a processing surface of said work perpendicular to said rotation axis and on a straight line passing through the rotation axis of the work;
    forming a zonal surface of the mold where said tip is relatively moved relative to said work on a tangent line parallel to the straight line and in contact with an outer circumference of the zonal surface of the work so as to form the zonal surface of the mold; and
    forming a corner portion of the mold between said circular portion of the mold and said zonal surface of the mold by contacting a raked surface of said tip with a boundary wall surface of the mold, which is provided between the circular portion of the mold and the zonal surface of the mold.

2. The process according to claim 1, wherein upon forming the corner portion, an orientation of said raked surface of the tip is changed and the boundary wall surface of the mold is tilted.

3. The process according to claim 2, wherein the raked surface is tilted so that the base end of the raked surface approaches the processing surface.

4. The process according to claim 2, where the raked surface is tilted with respect to an axis parallel to the rotation axis.

5. The process according to claim 3, where the tilting angle is not more than 5°.

6. The process according to claim 4, where the tilting angle is not more than 3°.

7. The process according to any one of claims 1 to 6, which further comprises a roughly processing stage for roughly processing the circular portion of the mold and/or the zonal surface of the mold prior to forming the circular portion and/or forming the zonal surface.

8. The process according to claim 4, wherein the raked surface is a flat top surface of the tip.

* * * * *